United States Patent
Nakano et al.

(10) Patent No.: US 9,684,067 B2
(45) Date of Patent: Jun. 20, 2017

(54) SOUND WAVE SENSOR, CORRECTION VALUE SETTING DEVICE, AND DISTANCE DETECTING DEVICE

(71) Applicant: DENSO CORPORATION, Kariya, Aichi-pref. (JP)

(72) Inventors: Akio Nakano, Anjo (JP); Mitsuyasu Matsuura, Chiryu (JP); Keiko Akiyama, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 125 days.

(21) Appl. No.: 14/436,787

(22) PCT Filed: Oct. 24, 2013

(86) PCT No.: PCT/JP2013/006305
§ 371 (c)(1),
(2) Date: Apr. 17, 2015

(87) PCT Pub. No.: WO2014/068924
PCT Pub. Date: May 8, 2014

(65) Prior Publication Data
US 2015/0268335 A1   Sep. 24, 2015

(30) Foreign Application Priority Data

Oct. 29, 2012   (JP) ................................ 2012-238008

(51) Int. Cl.
*G01S 7/52* (2006.01)
*G01S 15/08* (2006.01)
(Continued)

(52) U.S. Cl.
CPC ...... *G01S 7/52004* (2013.01); *G01S 7/52006* (2013.01); *G01S 7/529* (2013.01);
(Continued)

(58) Field of Classification Search
CPC .... G01S 15/931; G01S 7/52006; G01S 7/529; G01S 15/08; G01S 7/52004; G01S 15/04; G01S 15/876
See application file for complete search history.

(56) References Cited

U.S. PATENT DOCUMENTS 4,581,726 A   4/1986   Makino et al.
6,279,396 B1   8/2001   Imagawa et al.
(Continued)

FOREIGN PATENT DOCUMENTS

JP   S58189571 A   11/1983
JP   H03239979 A   10/1991
(Continued)

OTHER PUBLICATIONS

International Search Report and Written Opinion (in Japanese with English Translation) for PCT/JP2013/006305, mailed Nov. 19, 2013; ISA/JP.

*Primary Examiner* — Daniel Pihulic
(74) *Attorney, Agent, or Firm* — Harness, Dickey & Pierce, P.L.C.

(57) ABSTRACT

A sound wave sensor in a distance detecting system determines a presence or absence of a target object and a distance to the target object by receiving, with a preset sensitivity, a reflected wave obtained from a transmitted sound wave reflected by the target object. A correction value used to correct the sensitivity of the sound wave sensor is obtained from outside the sound wave sensor, and the sensitivity is corrected by using this correction value.

9 Claims, 8 Drawing Sheets

(51) Int. Cl.
   *G01S 15/04*     (2006.01)
   *G01S 15/93*     (2006.01)
   *G01S 7/529*     (2006.01)
   *G01S 15/87*     (2006.01)

(52) U.S. Cl.
   CPC .............. *G01S 15/04* (2013.01); *G01S 15/08* (2013.01); *G01S 15/876* (2013.01); *G01S 15/931* (2013.01)

(56) References Cited

U.S. PATENT DOCUMENTS

| | | |
|---|---|---|
| 2006/0196272 A1 | 9/2006 | Sugiura et al. |
| 2008/0089178 A1* | 4/2008 | Knittel .................. B06B 1/0215 367/98 |
| 2009/0260422 A1 | 10/2009 | Sugiura et al. |
| 2010/0259396 A1 | 10/2010 | Watabe et al. |
| 2012/0090395 A1* | 4/2012 | Lavoie ................ G01S 7/52006 73/620 |
| 2015/0268335 A1* | 9/2015 | Nakano ................ G01S 15/931 367/13 |

FOREIGN PATENT DOCUMENTS

| | | |
|---|---|---|
| JP | H05232242 A | 9/1993 |
| JP | H09184883 A | 7/1997 |
| JP | H11295419 A | 10/1999 |
| JP | 2008058059 A | 3/2008 |
| JP | 2009257978 A | 11/2009 |
| JP | 2010008158 A | 1/2010 |
| JP | 2010033534 A | 2/2010 |
| JP | 2010230427 A | 10/2010 |
| JP | 2010249834 A | 11/2010 |
| JP | 2010281793 A | 12/2010 |
| JP | 4715236 B2 | 7/2011 |

* cited by examiner

| No. | CONTENT | SETTING VALUE | RESOLUTION | NUMBER OF BITS |
|---|---|---|---|---|
| 1 | CORRECTION AMOUNT FOR AIR ATTENUATION PER 1m | 0 – 6.3dB | 0.1dB | 6 |
| 2 | START DISTANCE FOR AIR ATTENUATION CORRECTION | 0 – 3m | 0.2m | 4 |
| 3 | END DISTANCE FOR AIR ATTENUATION CORRECTION | 3 – 6m | 0.2m | 4 |
| 4 | START DISTANCE FOR DISTANCE ATTENUATION CORRECTION | 0 – 3m | 0.2m | 4 |
| 5 | END DISTANCE FOR DISTANCE ATTENUATION CORRECTION | 3 – 6m | 0.2m | 4 |
| 6 | CORRECTION RATIO FOR DISTANCE ATTENUATION | 0.25 – 1 | 0.25 | 2 |
| TOTAL | | | | 24 |

SOUND WAVE SENSOR, CORRECTION VALUE SETTING DEVICE, AND DISTANCE DETECTING DEVICE

CROSS REFERENCE TO RELATED APPLICATIONS

This application is a U.S. National Phase Application under 35 U.S.C. 371 of International Application No. PCT/JP2013/006305 filed on Oct. 24, 2013 and published in Japanese as WO 2014/068924 A1 on May 8, 2014. This application T is based on and claims the benefit of priority from Japanese Patent Applications No. 2012-238008 filed on Oct. 29, 2012. The entire disclosures of all of the above applications are incorporated herein by reference.

TECHNICAL FIELD

The present disclosure relates to a sound wave sensor for detecting a distance to a target object by transmitting and receiving a sound wave, a correction value setting device for setting a correction value for the sound wave sensor, and a distance detecting device.

BACKGROUND ART

A sound wave sensor was proposed that has a function to correct its own sensor characteristics by transmitting sound waves of different frequencies and by detecting effects of humidity and temperature based on their reflected waves received (e.g., patent literature 1).

PRIOR ART LITERATURES

Patent Literature

Patent Literature 1: JP 2010-249834A

SUMMARY OF INVENTION

However, since the above sound wave sensor needs to incorporate a structure for transmitting and receiving sound waves of different frequencies, the sensor may increase in size and complexity.

In view of the above, it is an object of the present disclosure, in a sound wave sensor for detecting a distance to a target object by transmitting and receiving a sound wave and peripheral devices of the sound wave sensor, to correct sensor characteristics while simplifying a structure of the sound wave sensor.

According to a first aspect of the present disclosure, a sound wave sensor is configured to detect a distance to a target object by transmitting and receiving a sound wave and includes a target object determining means for determining a presence or absence of the target object and the distance to the target object by receiving, with a preset sensitivity, a reflected wave obtained from the transmitted wave reflected by the target object, and a correction value obtaining means for obtaining a correction value used to correct a sensitivity of the sound wave sensor from outside the sound wave sensor and for correcting the sensitivity by using the correction value.

Since the correction value for the sensitivity is obtained from outside, the sound wave sensor can be simplified in structure compared to when the sound wave sensor corrects the sensitivity by itself by transmitting and receiving sound waves of multiple frequencies.

According to the present disclosure, the "sensitivity" indicates, for example, a receiving level of the reflected wave or a threshold value used to determine the presence or absence of the target object, and the correction value used to correct the sensitivity indicates a correction value used to correct the receiving level or the threshold value. Specifically, the target object determining means can be configured to determine the presence or absence of the target object and the distance to the target object by determining whether the receiving level of the reflected wave obtained from the transmitted wave reflected by the target object is equal to or greater than a preset threshold value.

The sensitivity can be corrected at a desired timing, for example, when the sound wave sensor is activated, when the target object is changed, or whenever the sound wave is transmitted.

According to a second aspect of the present disclosure, a correction value setting device is configured to set a correction value for a sensitivity of a sound wave sensor which detects a distance to a target object by transmitting and receiving a sound wave, and include a correction value setting means for sending the correction value to the sound wave sensor so that the correction value is set in the sound wave sensor. The correction value is used to correct the sensitivity with which the sound wave sensor determines a presence or absence of the target object and the distance to the target object.

The sound wave sensor of the first aspect and the correction value setting device of the second aspect can be combined into a distance detection device. The distance detection device can be implemented as a distance detection program for instructing a computer to act as each means of the distance detection device.

BRIEF DESCRIPTION OF THE DRAWINGS

The above and other objects, features and advantages of the present disclosure will become more apparent from the following detailed description made with reference to the accompanying drawings. In the drawings.

EMBODIMENTS FOR CARRYING OUT INVENTION

Below, an embodiment of the present disclosure is described with reference to the drawings.

Structure of Present Embodiment

Figure 1:
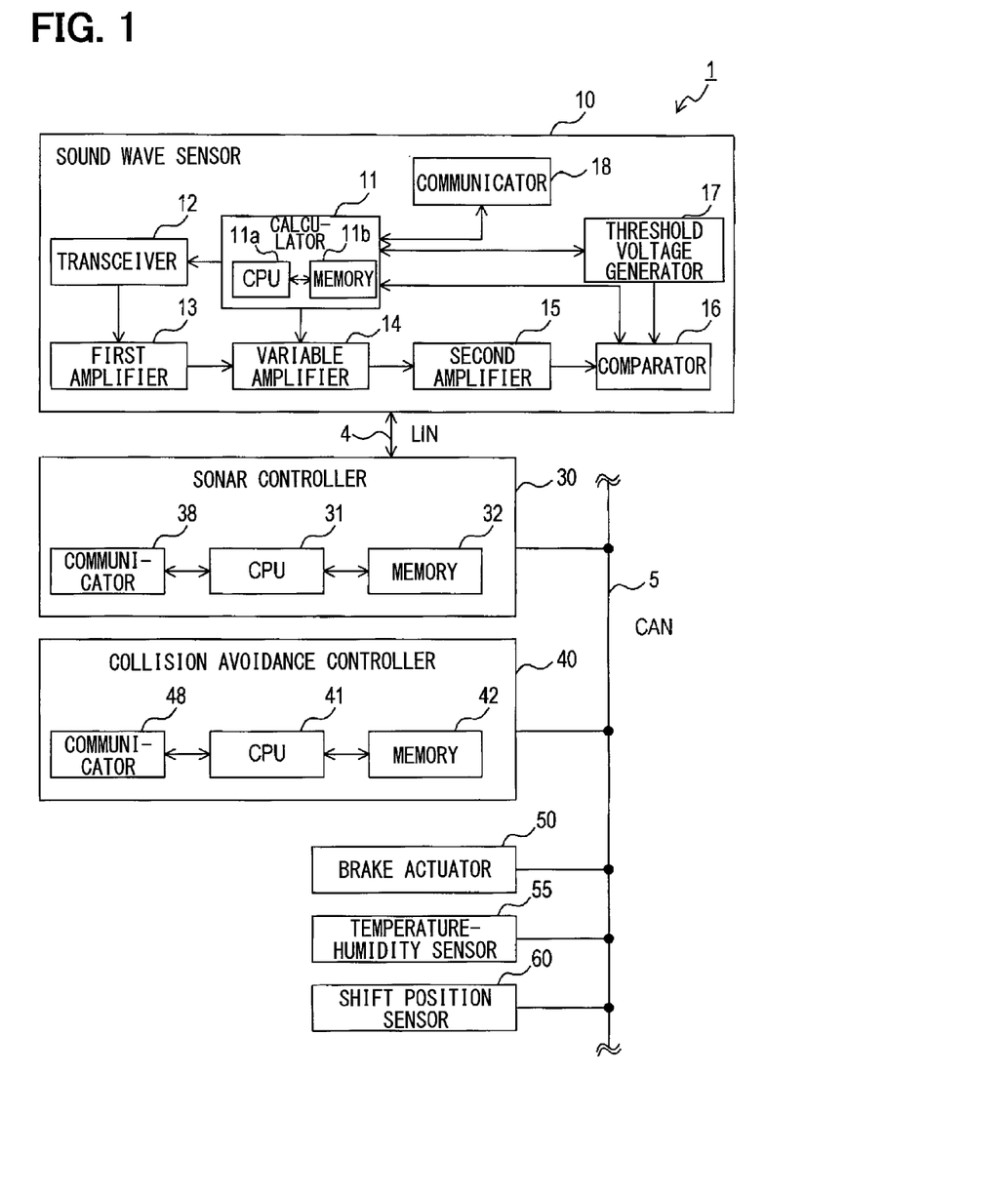
FIG. 1 is a diagram illustrating a simplified structure of a distance detection system 1 according to an embodiment of the present disclosure.

A distance detecting system 1 according to an embodiment of the present disclosure is mounted to, for example, a vehicle (subject vehicle) such as a car, detects obstacles such a wall and another vehicle beside or behind the subject vehicle, and performs control such as braking if it will cause problems in a movement of the subject vehicle. As shown in FIG. 1, the distance detecting system 1 includes a sound wave sensor 10, a sonar controller 30, a collision avoidance controller 40, a brake actuator 50, a temperature-humidity sensor 55, and a shift position sensor 60.

The sound wave sensor 10 and the sonar controller 30 are connected to each other by a communication line 4 where communication is performed by using LIN protocol, for example. The sonar controller 30, the collision avoidance controller 40, the brake actuator 50, the temperature-humidity sensor 55, and the shift position sensor 60 are connected to a communication line 5 where communication is performed by using CAN protocol.

The sound wave sensor 10 has functions, as a conventional sound wave sensor, to transmit and receive a sound wave such as an ultrasonic wave and to detect a distance to a target object by which the sound wave is reflected. In particular, according to the embodiment, the sound wave sensor 10 has a function to change its sensitivity according to the distance to and a type of the target object to be detected. The function to change the sensitivity is described later.

Figure 2:
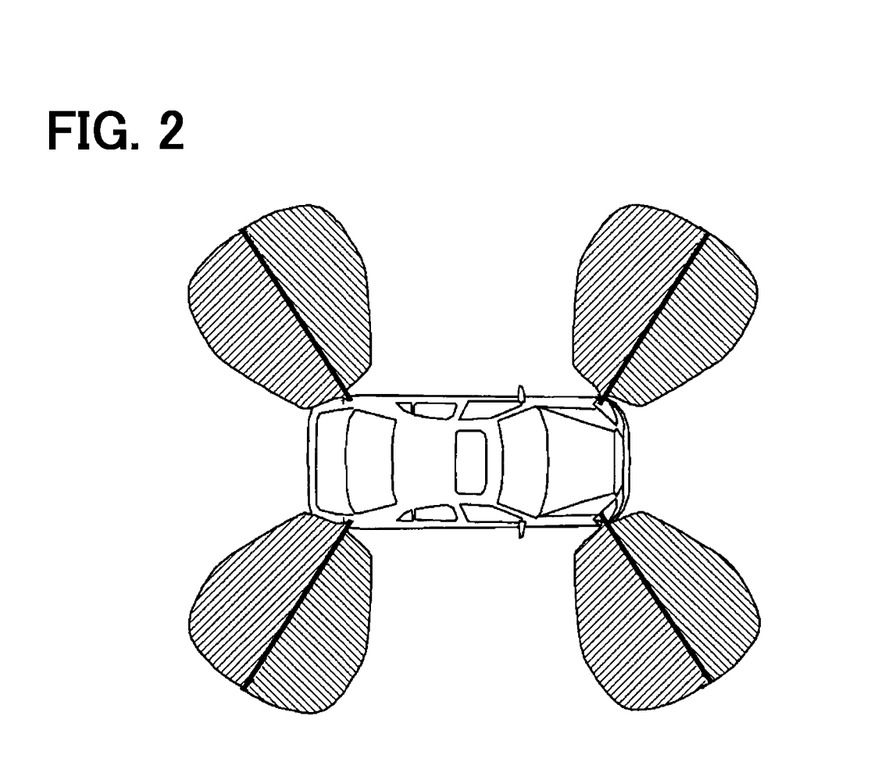
FIG. 2 is a top view illustrating an example of a detection area of a sound wave sensor 10.

As shown in FIG. 2, multiple sound wave sensors 10 are placed so that areas ahead, beside, and behind the vehicle can be included a detection area. It is noted that FIG. 1 shows one of the sound wave sensors 10.

The sound wave sensor 10 includes a calculator 11, a transceiver 12, a first amplifier 13, a variable amplifier 14, a second amplifier 15, a comparator 16, and a threshold voltage generator 17, and a communicator 18.

The calculator 11 is configured as a computer with a CPU 11a and a memory 11b and sends instructions to components of the sound wave sensor 10. The calculator 11 performs processes including a detection process as described later. A distance detection program according to the present disclosure is prestored in the memory 11b and executed by the CPU 11a.

The transceiver 12 transmits a sound wave in response to an instruction from the calculator 11, receives its reflected wave reflected by the target object, generates a signal according to the amplitude of a reception level of the reflected wave, and sends the signal to the first amplifier. For example, the transceiver 12 can include a piezoelectric device.

Each of the first amplifier 13 and the second amplifier 15 includes an amplification circuit. The first amplifier 13 amplifies the output signal of the transceiver 12 by a predetermined amplification factor.

The variable amplifier 14 amplifies an output signal of the first amplifier 13 by a desired amplification factor which is dynamically set by the calculator 11. The second amplifier 15 amplifies an output signal of the variable amplifier 14 by a predetermined amplification factor.

The threshold voltage generator 17 generates a threshold voltage for comparison in accordance with an instruction from the calculator 11. The comparator 16 compares the threshold voltage generated by the threshold voltage generator 17 with a voltage of an output signal of the second amplifier 15 and outputs a signal to the calculator 11 when the voltage of the output signal exceeds the threshold voltage.

The calculator 11 calculates a distance to the target object, by which the sound wave is reflected, according to time when the signal from the comparator 16 is received. It is noted that the calculator 11 sends the calculated distance to the sonar controller 30 through the communicator 18 and the communication line 4. The communicator 18 (the same is true for communicators 38 and 48) is configured as a conventional communication module and performs communication through the communication lines 4 and 5.

The sonar controller 30 includes a CPU 31, a memory 32, and a communicator 38. The CPU 31 performs processes in accordance with programs stored in the memory 32. Specifically, the CPU 31 performs a process to control the sound wave sensors 10, such as the settings of the sound wave sensors 10, and performs a process to send the calculated distance to the target object to the collision avoidance controller 40.

The collision avoidance controller 40 has a function to control a control target, such as the brake actuator 50, in accordance with the detection result of the target object. The collision avoidance controller 40 includes a CPU 41, a memory 42, and a communicator 48. The CPU 41, the memory 42, and the communicator 48 have the same hardware structure as the CPU 31, the memory 32, and the communicator 38 of the sonar controller 30. The CPU 41 of the collision avoidance controller 40 applies braking to the subject vehicle in accordance with the distance to the target object obtained by the sound wave sensor 10 and the speed of the subject vehicle.

The temperature-humidity sensor 55 detects a temperature and humidity outside the vehicle and outputs detection results to the sonar controller 30. The shift position sensor 60 detects a shift position of the vehicle and outputs a detection result to the sonar controller 30.

Processes in the Present Embodiment

A sensitivity setting process and a sensor process performed in the distance detecting system 1 are described with reference to FIG. 3. The sensitivity setting process and the sensor process are started when a power supply, such as an ignition switch, of the vehicle is turned ON.

Figure 3:
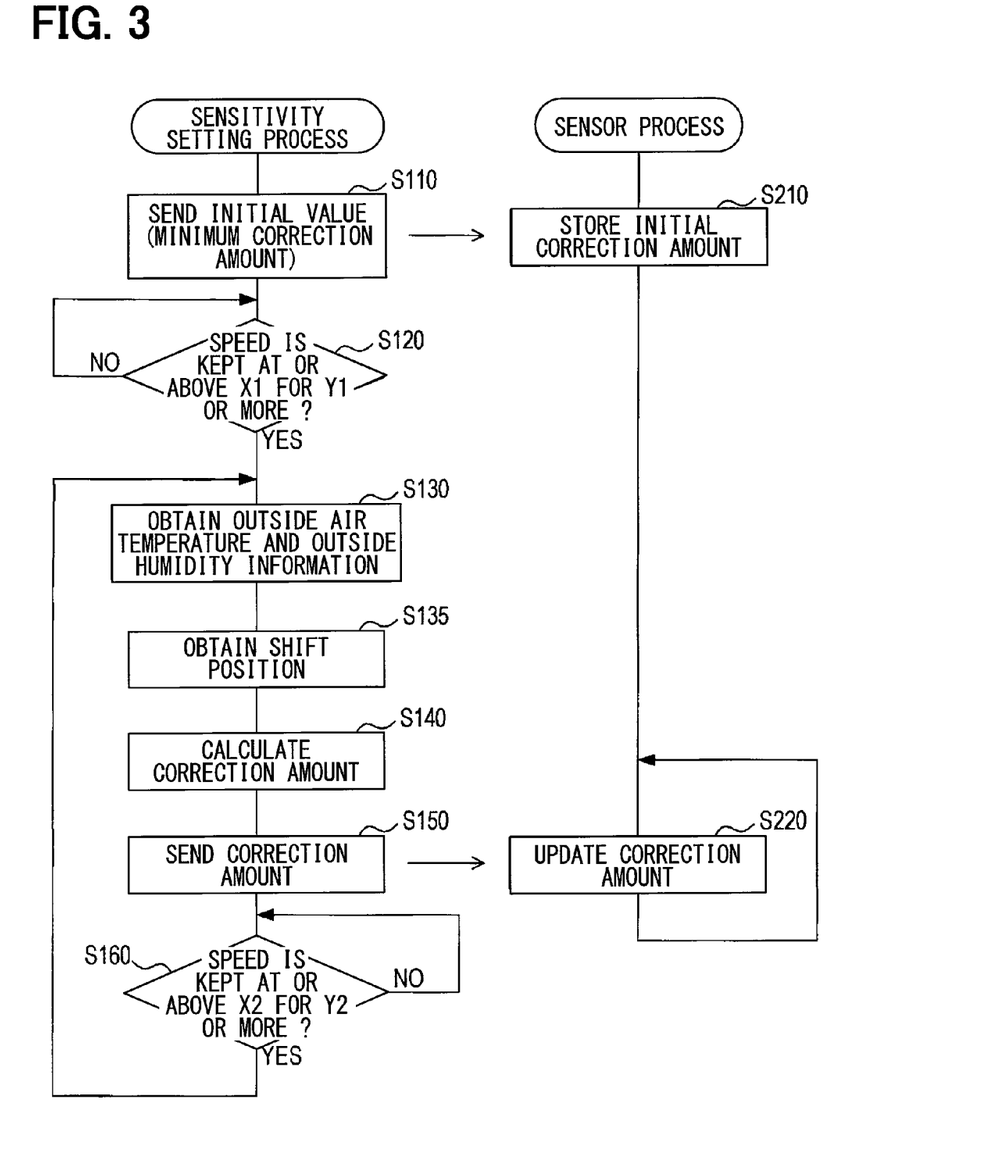
FIG. 3 is a flowchart illustrating a sensitivity setting process performed by a CPU 31 of a sonar controller 30 and a sensor process performed by a calculator 11 of the sound wave sensor 10.
Figure 4:
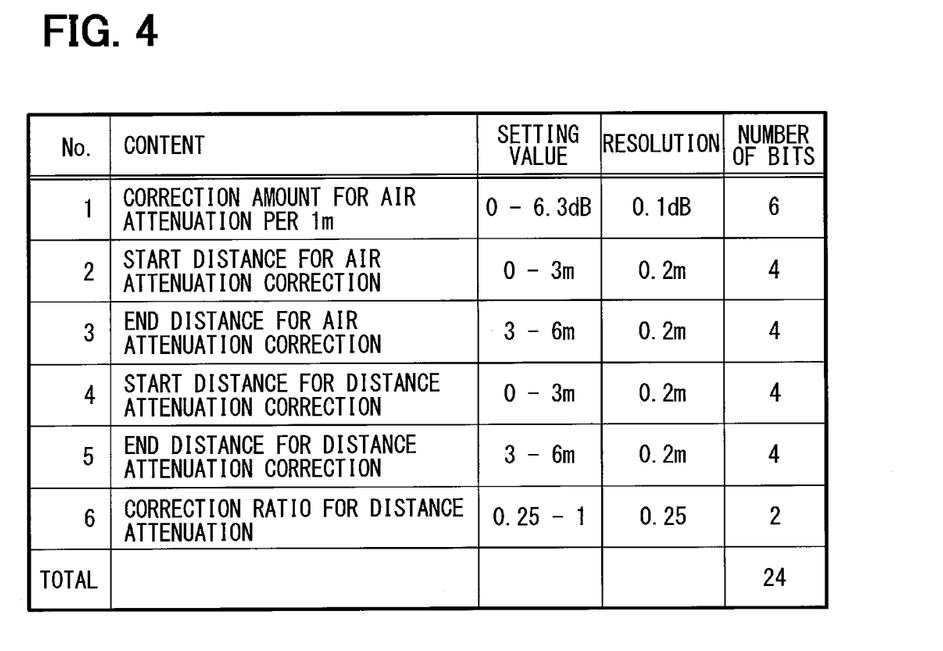
FIG. 4 is a diagram for explaining an example of data sent from the sonar controller 30 to the sound wave sensor 10.

Specifically, as shown in FIG. 3, firstly, in the sensitivity setting process, an initial value (e.g., a minimum correction amount) is sent to the sound wave sensor 10 (S110). For example, as shown in FIG. 4, the data sent from the sonar controller 30 to the sound wave sensor 10 can include a correction amount (air attenuation correction) depending on the temperature and humidity, a correction amount (distance attenuation correction) depending on the distance, or a correction amount (distance-air attenuation correction) determined based on both of these.

Further, this data can include information about a correction range (a range of the distance from the sound wave sensor 10). For the sake of simple explanation, the correction range is not taken into consideration in the present embodiment.

In the sound wave sensor 10, the initial value of the correction amount is stored in the memory 11b (S210). Then, the sonar controller 30 obtains a vehicle speed of the subject vehicle (traveling speed of the subject vehicle) from a conventional vehicle speed sensor and determines whether the vehicle speed is kept at or above X1 for Y1 seconds or more (S120). X1 and Y1 are set to values which are obtained when the temperature-humidity sensor 55 becomes capable of accurately detecting the temperature and humidity after the subject vehicle exits a parked state so that an outside air can hit the temperature-humidity sensor 55.

If the vehicle speed is kept at or above X1 for Y1 seconds or more (S120: YES), the detection result of the temperature-humidity sensor 55 is obtained (S130), and the shift position is obtained from the conventional shift position sensor 60 (S135). A reason to use the shift position is to identify the target object to be detected by the sound wave sensor 10.

When the shift position, such as D, indicates that the vehicle moves forward, relatively distant vehicles and obstacles are identified as the target object to search a parking space. Further, when the shift position, such as R, indicates that the vehicle moves backward, close vehicles and pedestrians are identified as the target object to avoid collision.

Figure 5A:
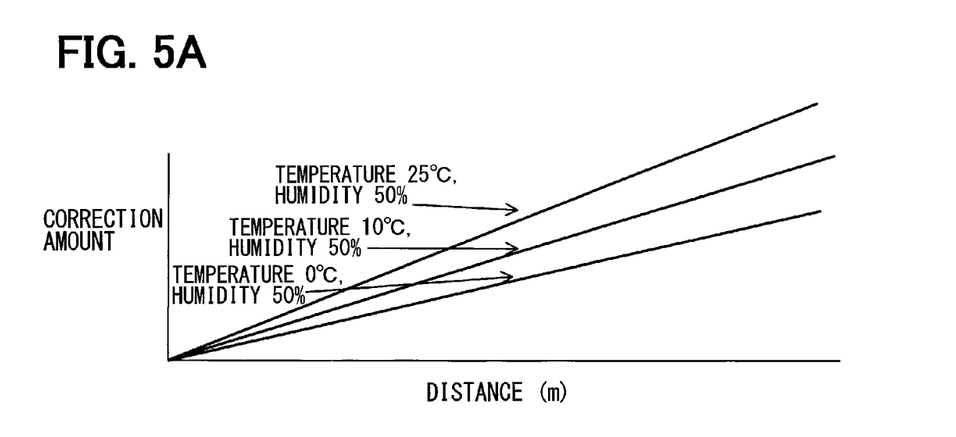
FIG. 5A is a graph illustrating an example of a correction amount for a distance according to the embodiment.
Figure 5B:
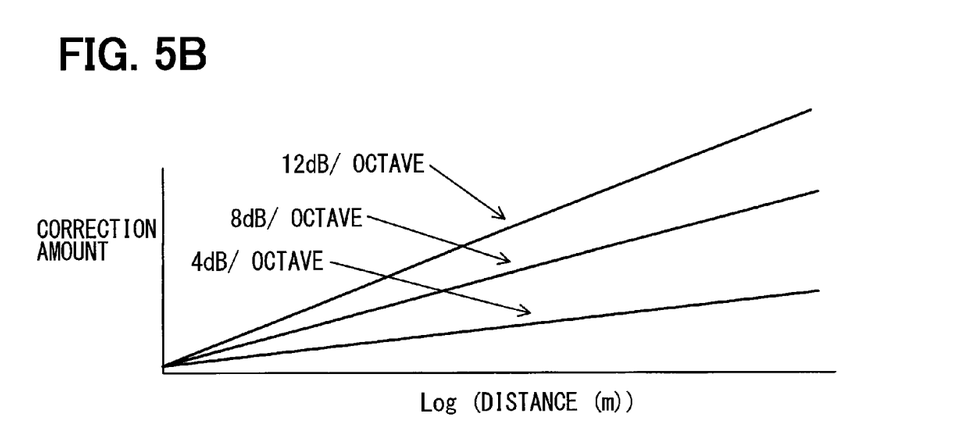
FIG. 5B is a graph illustrating an example of a correction amount for a distance according to the embodiment.

Next, a correction amount is calculated (S140). In this process, to perform the air attenuation correction, the correction amount is determined in consideration of temperature-humidity information. For example, as shown in FIG. 5B, a map defining the correction amount proportional to the temperature, the humidity, and the distance is prestored in the memory 32 of the sonar controller 30, and the correction value is determined by using this map.

Further, the distance attenuation correction is performed. For example, as shown in FIG. 5B, a map defining multiple correction values proportional to the logarithm of the distance is prestored in the memory 32 of the sonar controller 30, and the correction value to be used is selected from this map. At this time, which correction value is selected is determined according to the shift position. That is, when it is estimated that the distance to the target object is relatively large (when moving forward), a larger correction value is selected so that the sensitivity can be high, and when it is estimated that the distance to the target object is relatively small (when moving backward), a smaller correction value is selected so that the sensitivity cannot be so high.

Then, the value set by using these maps is written as the data shown in FIG. 4, and this data (calculated correction amount) is sent to the sound wave sensor 10 (S150). When receiving this correction amount, the sound wave sensor 10 updates the correction amount.

Then, the sonar controller 30 determines whether the vehicle speed is kept at or above X2 for Y2 seconds or more (S160). Here, the speed X2 is almost equal to or greater than X1, and the time Y2 is greater than Y1. That is, this process is intended for environmental changes caused when the vehicle moves stably on a highway, for example.

If the vehicle speed is not kept at or above X2 for Y2 seconds or more (S160: NO), S160 is repeated. In contrast, if the vehicle speed is kept at or above X2 for Y2 seconds or more (S160: YES), it returns to S130.

In the sound wave sensor 10, when detecting the distance to the target object by transmitting and receiving a sound wave after setting the correction amount through the above processes, the amplification factor is continuously corrected through the variable amplifier 14 according to a lapse of time from when the sound wave is transmitted to when the reflected wave is received.

Although the data obtained from the sonar controller 30 contains only a relationship between the distance and the correction value, the distance can be calculated by dividing the time elapsed until the reflected wave is received by a sound speed.

Figure 6A:
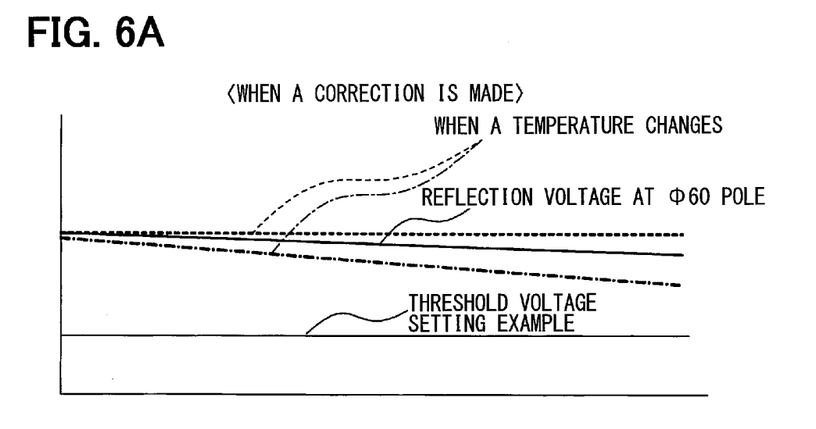
FIG. 6A is a diagram for explaining an effect of the embodiment.
Figure 6B:
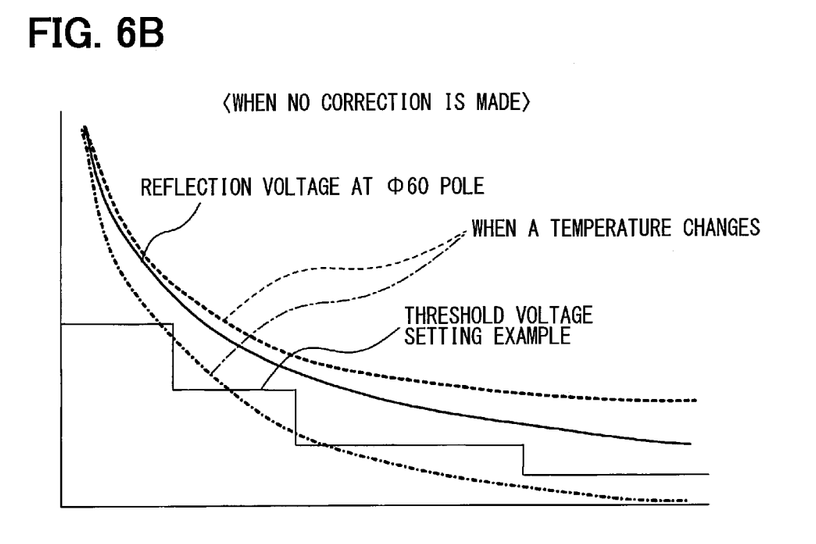
FIG. 6B is a diagram illustrating a comparison example.

Thus, as shown in FIG. 6A, the reflected wave can have a substantially constant strength without depending on the temperature and humidity. Instead of performing the correction like in the present embodiment, the threshold voltage may be changed stepwise as shown in FIG. 6B. However, since the strength of the reflected wave changes with changes in the temperature and humidity, there is a possibility that the target object may not be detected accurately.

Effects of the Present Embodiment

In the distance detecting system 1 described above, the sound wave sensor 10 detects the presence or absence of the target object and the distance to the target object by receiving, with a preset sensitivity, the reflected wave obtained from the transmitted wave reflected by the target object. Then, the calculator 11 obtains the correction value used to correct the sensitivity of the sound wave sensor 10 from outside the sound wave sensor 10 and corrects the sensitivity using the correction value.

In the distance detecting system 1, since the correction value of the sensitivity is obtained from outside, the sound wave sensor 10 can be simplified in structure compared to when the sound wave sensor 10 corrects the sensitivity by itself by transmitting and receiving sound waves of multiple frequencies.

The CPU 31 of the sonar controller 30 sends the correction value used by the sound wave sensor 10 to correct the sensitivity to detect the present or absence of the target object and the distance to the target object, thereby setting the correction value used in the sound wave sensor 10.

In the distance detecting system 1, since the sonar controller 30 has a function to set the correction value used in the sound wave sensor 10, the sound wave sensor 10 can be simplified in structure. Further, since the correction value can be suitably set according to a use environment (installation position, installation angle, etc.) of the sound wave sensor 10, the sound wave sensor 10 can be used in different environments easily.

Further, the CPU 31 of the sonar controller 30 obtains the temperature-humidity information indicative of at least one of the ambient temperature and humidity of the sound wave sensor 10 and determines the correction amount in consideration of the temperature-humidity information. Then, the CPU 31 sets the determined correction value in the sound wave sensor 10.

In the distance detecting system 1 like this, the correction value can be suitably set in consideration of a change in the amount of attenuation of the sound wave according to the temperature or humidity.

Further, the CPU 31 of the sonar controller 30 obtains target object information about the target object to be detected by the sound wave sensor 10 and determines the correction value in consideration of the target object information.

In the distance detecting system 1 like this, the sound wave sensor 10 can serve as a sensor having a suitable detection area or sensitivity according to the target object.

Further, the CPU 31 of the sonar controller 30 selects the correction value to be used from multiple prepared correction values according to the target object information.

In the distance detecting system 1 like this, since the correction value is selected from multiple correction values, a process for determining the correction value can be simplified compared to a structure where the correction value is calculated.

Further, the CPU 31 of the sonar controller 30 calculates the correction value when the vehicle speed of the subject vehicle is kept at or above a reference speed for a reference time or more, and then it sends the correction value to the sound wave sensor 10, thereby setting the correction value in the sound wave sensor 10. That is, when a vehicle is stopped, heat of an engine may cause a temperature sensor mounted to the vehicle to detect a temperature higher than an actual outside temperature depending on its mounting position. For this reason, the correction value is determined after it is cooled by winds during the movement and becomes capable of detecting the outside temperature accurately. Before that, a value just after activation is temporarily used, or a preset fixed value is used.

In the distance detecting system 1 like this, a more suitable correction value can be set in the sound wave sensor 10.

Modifications

While the present disclosure has been described with reference to the embodiments, it is to be understood that the disclosure is not limited to the embodiments. The present disclosure is intended to cover various modifications and equivalent arrangements within the spirit and scope of the present disclosure.

For example, although the sensitivity is corrected by correcting the amplification factor (gain) in the embodiment, it can be corrected by correcting the threshold voltage so that the same characteristics can be achieved.

Figure 7:
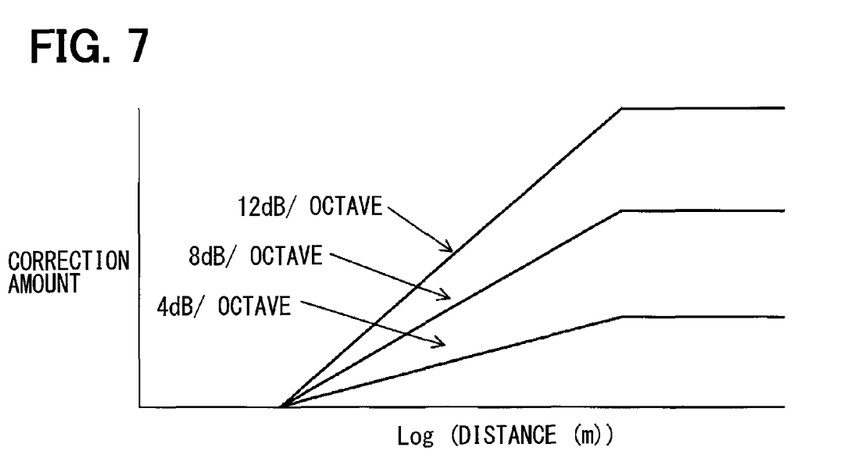
FIG. 7 is a graph illustrating an example of a correction amount for a distance according to a modification.

Further, although upper and lower limits are not set on the distance to perform the correction, these values can be set. For example, when an upper limit is set on the distance to perform the correction, the correction amount is kept constant if the distance exceeds a predetermined value as shown in FIG. 7. In such an approach, a target detection range is suitably set so that the sensitivity can be corrected only within a distance range where the correction needs to be performed.

Further, when the road surface is detected, the sensitivity can be set low so that the road surface cannot be detected. In this case, for example, a road surface correction process shown in FIG. 8 can be performed.

Figure 8:
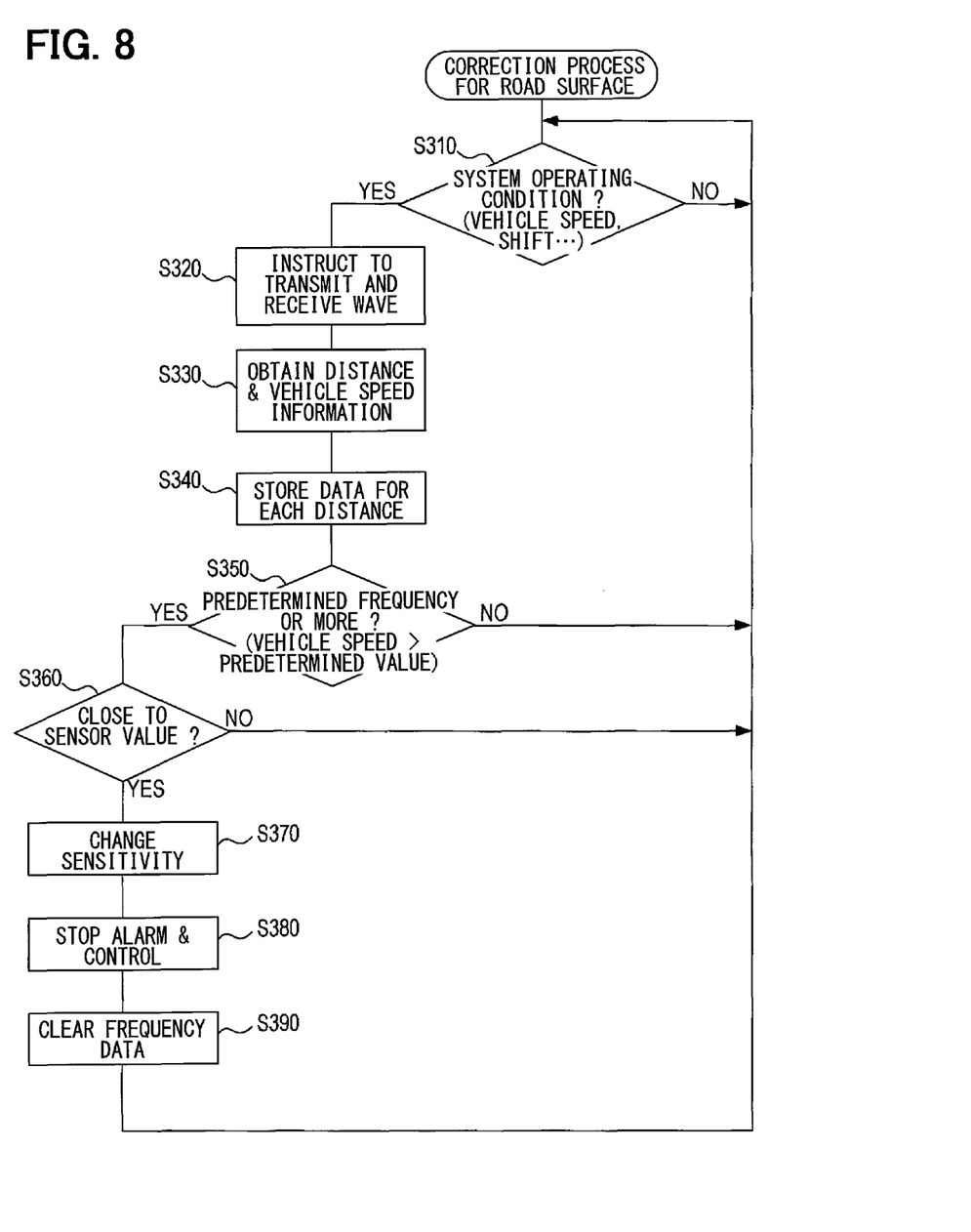
FIG. 8 is a flowchart illustrating a road surface correction process performed by the CPU 31 of the sonar controller 30.

In the road surface correction process, as shown in FIG. 8, firstly, it is determined whether a system activation condition is satisfied (S310). For example, the system activation condition can be that the vehicle speed is equal to or greater than a predetermined value or that the shift position is not P or N.

If the system activation condition is not satisfied (S310: NO), S310 is repeated. In contrast, if the system activation condition is satisfied (S310: YES), an instruction to cause the sound wave sensor 10 to detect the target object (to transmit and receive a sound wave) is issued (S320), and information about the distance is obtained from the sound wave sensor 10 (S330). At this time, information about the vehicle speed is obtained from the conventional vehicle sensor.

Then, distance information is stored as data for each obtained distance (S340). Then, it is determined whether the detection result obtained from a certain sound wave sensor 10 indicates that a frequency with which the same distance is detected is equal to or greater than a reference value (e.g., about 40%) (S350).

If the frequency with which the same distance is detected is less than the reference value (S350: NO), it returns to S310. In contrast, If the frequency with which the same distance is detected is equal to or greater than the reference value (S350: YES), it is determined whether the detection result of another sound wave sensor 10 indicates almost the same distance as indicated by the detection result of the certain sound wave sensor 10 (S360).

If the detection result of the other sound wave sensor 10 does not indicate almost the same distance (S360: NO), it returns to S310. In contrast, if the detection result of the other sound wave sensor 10 indicates almost the same distance (S360: YES), the amplification factor or the threshold value is changed (S370) so that the sensitivity can be lowered (for example, lowered by one on a scale of ten). Then, the collision avoidance controller 40 is caused to stop alarming and controlling based on the sensitivity before the change (S380), the data of the distance information is cleared (S390), and it returns to S310.

In the above-described distance detecting system, the CPU 31 of the sonar controller 30 repeatedly obtains the detection value of the sound wave sensor 10 and sets the correction value so that the sensitivity of the sound wave sensor 10 can be reduced when the detection value indicates the same distance a predetermined number of times (with a predetermined frequency) or more.

In the distance detecting system like this, the target object which is detected a predetermined number of times or more is determined as a road surface, and the sensitivity of the sound wave sensor 10 is set so that the road surface cannot be detected.

Further, the CPU 31 of the sonar controller 30 obtains the detection values of multiple sound wave sensors 10 and sets the correction value so that the sensitivity of the sound wave sensor 10 can be reduced when the detection values of the multiple sensors indicate the same distance.

In the distance detecting system like this, the target object which is detected as being located at the same distance by the multiple sound wave sensors 10 is determined as a road surface, and the sensitivity of the sound wave sensor 10 is set so that the road surface cannot be detected.

Although the target object is identified based on the shift position detected by the shift sensor in the embodiment, information about the target object can be detected or obtained separately.

The sensitivity of the sound wave sensor 10 can be corrected at a desired timing. Although the sensitivity is corrected when the sound wave sensor 10 is activated in the embodiment, it can be corrected, for example, when the target object is changed or whenever the sound wave is transmitted.

Correspondence Between Structures of the Embodiment and Means of the Present Disclosure A main structure (the calculator 11, the transceiver 12, the first amplifier 13, the variable amplifier 14, the second amplifier 15, the comparator 16, and the threshold voltage generator 17) of the sound wave sensor 10 of the present embodiment corresponds to a target determining means, and a sonar controller 30 corresponds to a correction value setting device of the present disclosure. Further, out of the processes of the embodiment, S130 corresponds to a temperature-humidity information obtaining means, and S135 corresponds to a target object information obtaining means.

Further, S140 of the embodiment corresponds to a correction value determining means of the present disclosure, and S350 to S370 correspond to a correction value setting means of the present disclosure. Further, S210 and S220 correspond to a correction value obtaining means of the present disclosure, and S330 corresponds to a first sensor value obtaining means and a second sensor value obtaining means of the present disclosure.

The invention claimed is:

1. A sound wave sensor for detecting a distance to a target object by transmitting and receiving a sound wave, comprising:
    a target object determinator configured to determine a presence or absence of the target object and the distance to the target object by receiving, with a preset sensitivity, a reflected wave obtained from the transmitted wave reflected by the target object, and
    a correction value obtainer configured to obtain a correction value used to correct a sensitivity of the sound wave sensor from a correction value setting device outside the sound wave sensor and configured to correct the sensitivity by using the correction value, wherein
    the correction value setting device and the sound wave sensor are mounted to a vehicle, and
    when a speed of the vehicle is kept at or above a reference speed for a reference time or more, the correction value setting device sends the correction value to the correction value obtainer of the sound wave sensor so that the correction value is set in the sound wave sensor.

2. A correction value setting device for setting a correction value for a sensitivity of a sound wave sensor which detects a distance to a target object by transmitting and receiving a sound wave, comprising:
    a correction value setter configured to send the correction value to the sound wave sensor so that the correction value is set in the sound wave sensor, wherein
    the correction value is used to correct the sensitivity with which the sound wave sensor determines a presence or absence of the target object and the distance to the target object,
    the correction value setting device and the sound wave sensor are mounted to a vehicle, and
    when a speed of the vehicle is kept at or above a reference speed for a reference time or more, the correction value setter sends the correction value to the sound wave sensor so that the correction value is set in the sound wave sensor.

3. The correction value setting device according to claim 2, further comprising:
    a temperature-humidity information obtainer configured to obtain temperature-humidity information indicative of at least one of an ambient temperature and an ambient humidity of the sound wave sensor, and
    a correction value determinator configured to determine the correction value in consideration of the temperature-humidity information, wherein
    the correction value setter sets in the sound wave sensor the correction value determined by the correction value determinator.

4. The correction value setting device according to claim 3, further comprising:
    a detection target information obtainer configured to obtain detection target information about the target object to be detected by the sound wave sensor, wherein
    the correction value determinator determines the correction value in consideration of the detection target information.

5. The correction value setting device according to claim 4, wherein
    the correction value determinator selects the corrected value to be used from a plurality of prepared correction values according to the detection target information.

6. The correction value setting device according to claim 3, wherein
    the correction value determinator sets the correction value when the distance is within a predetermined range and does not set the correction value when the distance is outside the predetermined range.

7. The correction value setting device according to claim 2, further comprising:
    a first sensor value obtainer configured to repeatedly obtain a detection value of the sound wave sensor, wherein
    the correction value setter and the sound wave sensor are mounted to a vehicle, and
    when the detection value indicates the same distance a predetermined number of times or more, the correction value setter sets the correction value so that the sensitivity is reduced.

8. The correction value setting device according to claim 2, further comprising:
    a second sensor value obtainer configured to obtain detection values of a plurality of sound wave sensors including the sound wave sensor, wherein
    the correction value setting device and the sound wave sensors are mounted to a vehicle, and
    when the detection values of the sound wave sensors indicate the same distance, the correction value setter sets the correction value so that the sensitivity is reduced.

9. A distance detecting device comprising:
    a sound wave sensor configured to detect a distance to a target object by transmitting and receiving a sound wave, and
    a correction value setting device configured to set a correction value for a sensitivity of the sound wave sensor, wherein
    the sound wave sensor includes a target object determinator and a correction value obtainer,
    the target object determinator determines a presence or absence of the target object and the distance to the target object by receiving, with a preset sensitivity, a reflected wave obtained from the transmitted wave reflected by the target object,
    the correction value obtainer obtains the correction value used to correct the sensitivity of the sound wave sensor from the correction value setting device and corrects the sensitivity by using the correction value,
    the correction value setting device includes a correction value setter configured to send the correction value to the sound wave sensor so that the correction value is set in the sound wave sensor,
    the correction value setting device and the sound wave sensor are mounted to a vehicle, and
    when a speed of the vehicle is kept at or above a reference speed for a reference time or more, the correction value setter sends the correction value to the sound wave sensor so that the correction value is set in the sound wave sensor.

* * * * *